Figures 1, 7:
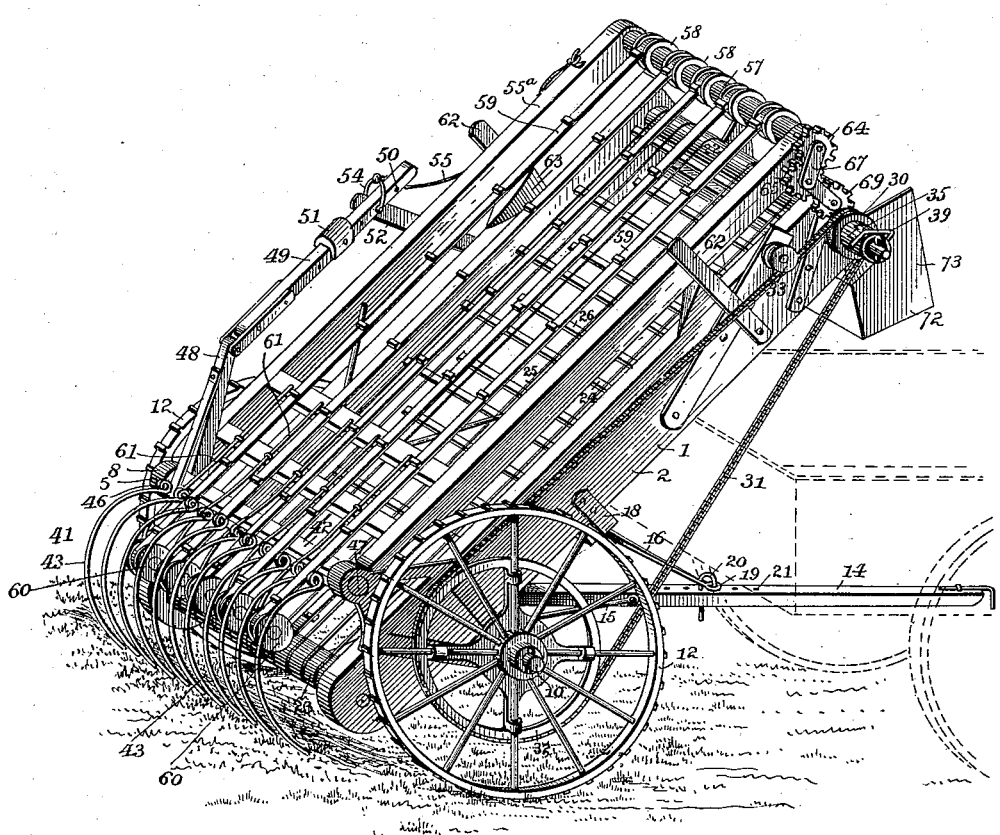

(No Model.) 3 Sheets—Sheet 1.
J. MARTIN.
HAY RAKE AND LOADER.
No. 531,205. Patented Dec. 18, 1894.

Witnesses
Chas. H. Durand
[signature]

Inventor
John Martin
By his Attorneys.
C. A. Snow & Co.

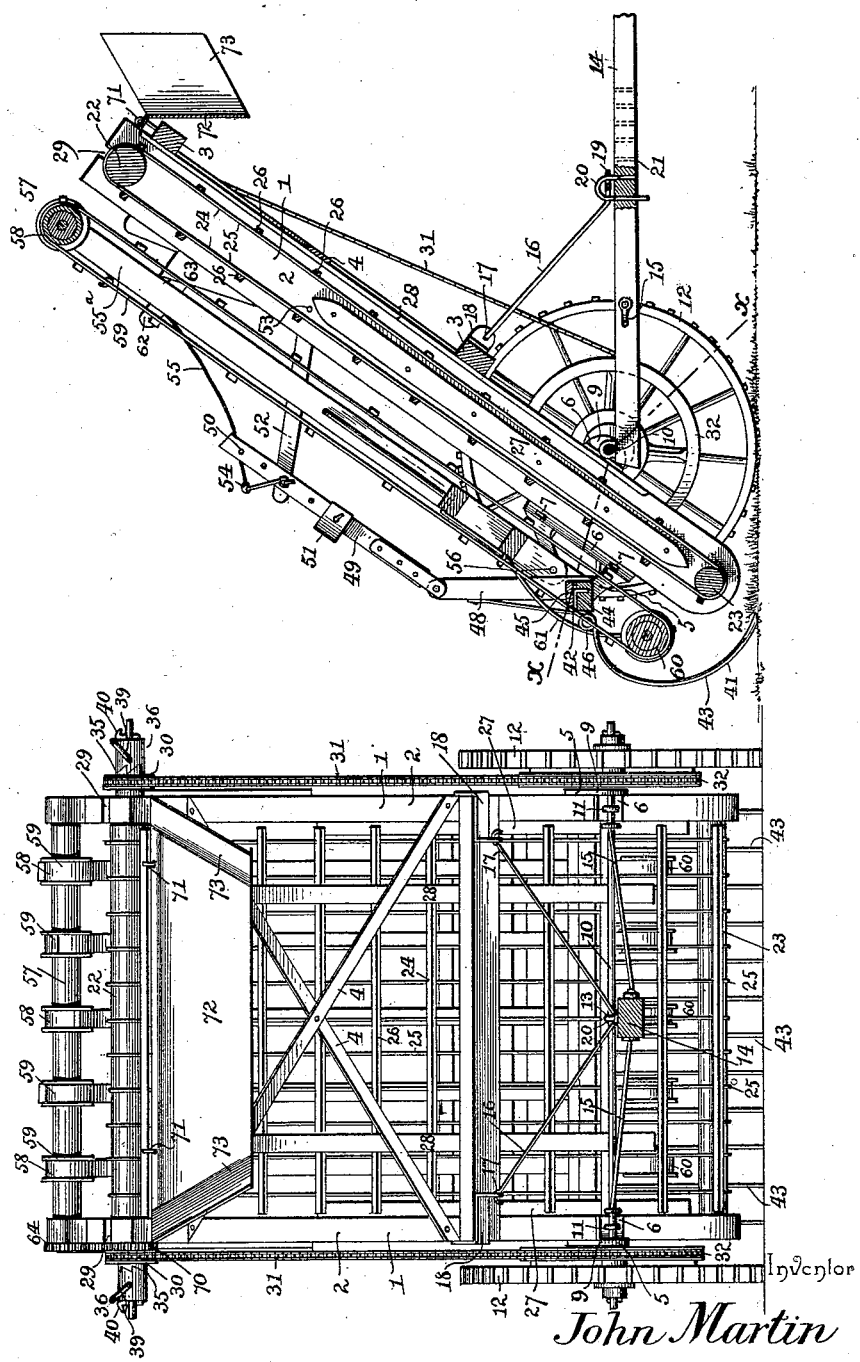

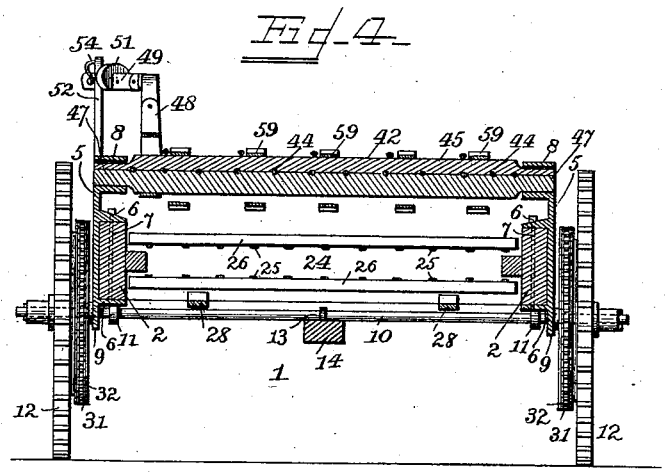
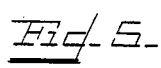
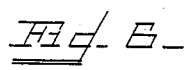
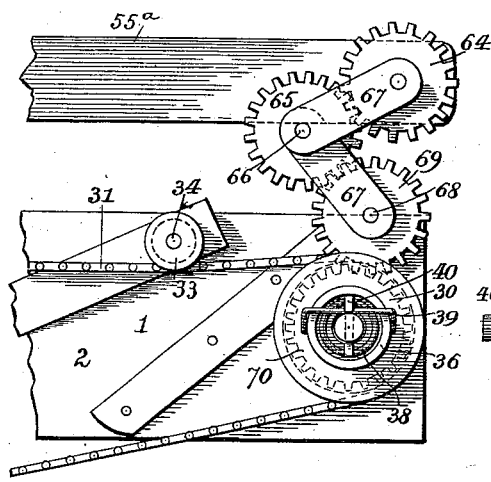
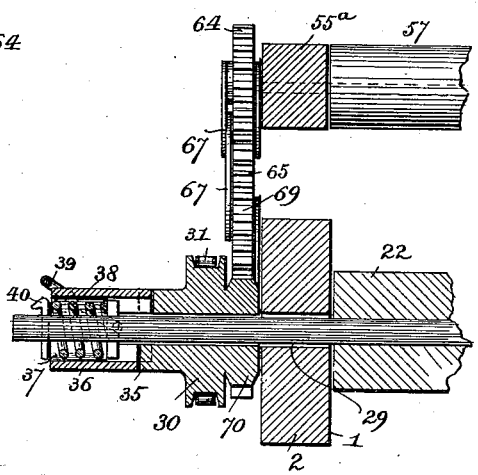

UNITED STATES PATENT OFFICE.

JOHN MARTIN, OF BELVIEW, MINNESOTA.

HAY RAKE AND LOADER.

SPECIFICATION forming part of Letters Patent No. 531,205, dated December 18, 1894.

Application filed June 4, 1894. Serial No. 513,429. (No model.)

*To all whom it may concern:*

Be it known that I, JOHN MARTIN, a citizen of the United States, residing at Belview, in the county of Redwood and State of Minnesota, have invented a new and useful Hay Rake and Loader, of which the following is a specification.

This invention relates to hay rakes and loaders; and it has for its object to effect certain improvements in machines of this character, whereby hay from either the swath or windrow may be effectually and completely caught up and elevated onto the wagon.

To this end the main and primary object of the present invention is to provide a combined hay rake and loader equipped with certain improvements to render the same very efficient in the work of raking up and elevating the hay to the wagons.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a combined hay rake and loader constructed in accordance with this invention. Fig. 2 is a front view thereof. Fig. 3 is a central vertical longitudinal sectional view. Fig. 4 is a transverse sectional view on the line $x$—$x$ of Fig. 3. Fig. 5 is an enlarged detail elevation at the upper end of the main carrier frame showing the adjustable gearing for driving the auxiliary carrier belts. Fig. 6 is a detail sectional view of the construction illustrated in Fig. 5. Fig. 7 is a detail in perspective of one of the spring wire supporting arms and the belt pulley journaled on the outer angled end thereof.

Referring to the accompanying drawings, 1 designates the inclined carrier frame consisting essentially of the parallel frame sides 2, and a series of transverse cross bars 3 connecting said sides to complete and strengthen the frame, and in order to additionally strengthen the frame the said opposite frame sides 2, may be connected by the diagonally crossed brace straps or bars 4, intersecting each other at a point intermediate between the sides 2, and suitably secured at their extremities to the under sides of the opposite frame sides 2. The inclined carrier frame 1 has attached to opposite sides thereof near its rear lower end, the opposite side bearing plates 5. The opposite side bearing plates 5, are provided at their inner sides with the offstanding attaching flanges 6, that embrace the upper and lower edges of the frame sides 2, and are suitably secured thereto on the bolts 7, passing through said flanges and the frame sides.

The opposite side bearing plates 5, are extended above the upper flanges thereof and are provided in such extensions with integral bearing collars 8, the function of which will presently appear, and below the lower flanges thereof, the said bearing plates are provided with the bearing lugs 9, that accommodate the opposite ends of the transverse supporting axle 10, the extremities of which inside of the lugs 9, are additionally secured in position by the clip bolts 11 embracing the same and engaging the lower flanges of the said bearing plates, and outside of the lugs 9, the spindle ends of the axle 10, loosely accommodate thereon the ground wheels 12, that provide for the travel of the machine over the ground and also for communicating motion to the working parts thereof.

The axle 10, has pivotally connected thereto at 13, the inner end of the draft tongue 14, the outer end of which is adapted to be secured to the rear end of a hay wagon in the ordinary manner, and said draft tongue 14, is securely braced in its pivotal connection with the axle 10, by the side brace arms or rods 15, connected at their front ends to opposite sides of the tongue and loosely or pivotally embracing the axle at the rear ends in order that the said tongue may be readily adjusted up and down to lower the carrier frame onto the ground when not in use, or to adjust the same to the desired pitch, said tongue being held in its adjusted position by means of the V-shaped securing frame 16. The opposite extremities of the V-shaped securing frame 16, are loosely engaged at 17, in the bracket plates 18, secured at opposite sides of the carrier frame 1, and at its angle or apex, the said frame 16, is provided with an engaging eye 19, adapted to be detachably engaged by one arm of the U- shaped lock pin or bolt 20, which arm and the other arm of the pin or bolt are adapted to engage perforations or holes 21, in the tongue.

The inclined carrier frame 1, has journaled in its upper and lower ends, the upper and lower apron rollers 22 and 23 respectively, which accommodate thereover the endless main carrier apron 24, which apron comprises a series of parallel carrier belts 25, connected transversely by the carrier slats 26, which are formed in lengths equaling the space between the opposite frame sides 2, in order to provide an apron as wide as the frame 1, and for a portion of the apron's travel, the opposite extremities of the slats thereof travel on the supporting cleats 27, secured longitudinally along the inner sides of the opposite frame sides 2, in order to prevent sagging of the upper portion of the carrier apron and to hold the upper and lower portions of the apron separated to prevent interference, and the lower portion of said carrier apron works inside of the carrier frame over the bottom thereof formed by the transverse cross bars 3, the straps or bars 4, and the longitudinal bottom strips 28, secured on the bars 3 and 4.

The spindle ends of the upper apron roller 22 turn in the open bearing slots or notches 29, formed in the upper end of the frame sides 2, and outside of the frame sides, the spindle or shaft extremities of the roller 22, have loosely mounted thereon the small chain or sprocket wheel 30, over which pass the upper portions of the endless drive chains 31, the other portions of which pass over the large drive sprocket wheels 32, secured to the inner sides of the ground wheels 12, and rotated thereby. The upper portions of the endless drive chains 31, near the wheels 30, pass under the idler tension rollers 33, journaled on the stub shafts 34, suitably supported at one side of the frame sides 2, and said rollers 33 serve to hold the said chains at the proper tension in order to transmit motion to the wheels 30. The said wheels 30, are mounted loosely on the shaft ends of the upper roller and are provided at one side with the clutch faces 35, that are normally engaged by the clutch collars 36. The clutch collars 36, are feathered on the shaft ends of the upper roller 22, and are provided with the spring sockets 37, which accommodate the springs 38, for holding the same normally in engagement with the clutch faces of the wheels 30 whereby, as the machine advances, the main carrier apron will be operated, while in turning corners and backing, the clutch members will not positively engage each other. The sliding clutch collars 36, may be locked out of engagement with the clutch faces of the wheels 30, by means of the U-shaped lock bails 39, the extremities of which are loosely connected to the said collars, and the outer closed ends of which are adapted to be temporarily moved into engagement with the catch pins 40, located at the outer ends of the said clutch collars and also forming stops for one end of the springs 38, within the collars.

As the machine advances the carrier apron 24, will be moved in the direction to elevate the hay that is delivered to the lower end thereof by the lower adjustable rake 41. The lower adjustable rake 41, consists of the oscillating rake bar 42, and a series of rearwardly and downwardly curved spring wire rake teeth 43, which are connected at their upper ends to the oscillating rake bar 42, said rake teeth being provided at such upper ends with the U-shaped portions 44, the extremities of which are held embedded in the rake bar 42, by the clamp strip 45, secured thereon, and said teeth are also provided near their upper ends at one side of the rake bar with the spring coil eyes 46, that add to the resiliency or spring of the teeth, and therefore to the durability and efficiency thereof to properly rake up the hay and deliver it onto the apron 24.

The oscillating rake bar 42, is provided with the rounded spindle extremities 47, that are journaled in the top bearing collars 8, of the opposite side bearing plates 5, and attached to the rake bar near one end is the off-standing rock arm 48, to the upper end of which is pivotally connected one end of the weight arm 49, which is provided with a longitudinal series of perforations 50, and adjustably accommodates thereon the weight block 51, that holds the arm normally depressed to hold the rake in its lowered operative position, and adjustably connected with the said weight arm is one end of the swinging adjusting arm 52, the other end of which is pivoted at 53, to one side of the frame 1, and at the joint or connection between the arms 49, and 52, is arranged an attaching bail or loop 54, to which is connected one end of the cord or wire 55, whereby the operator may lift up the arm 49 in order to lift the rake off of the ground when so desired.

Arranged directly over the inclined carrier frame 1, is the self-adjusting supplemental carrier frame 55ª, consisting of opposite side frame bars and intermediate cross bars connecting the same, and said self-adjusting supplemental carrier frame is pivotally connected at its lower end at 56, to the inner sides of the side bearing plates 5, and at its other movable end the said frame carries the belt roller 57, on which roller is mounted a series of regularly spaced flanged belt pulleys 58, over which pass the upper ends of the auxiliary carrier belt 59. The auxiliary carrier belts 59 are arranged in parallel series at regularly spaced distances apart and serve to confine the hay on the main apron 24, and to assist in the elevation thereof. The lower ends of the belts 59, pass around the lower flanged belt pulleys 60, journaled at the outer angled ends of the spring wire supporting arms 61, attached fast at their inner ends on the lower portion of the frame 55ª. The said arms 61, extend over and beyond the oscillating rake bar 42, so as to dispose the pulleys 60, between the rake teeth, whereby the same may readily adjust themselves to the adjusted position of the frame 55ª, and to any pull or uneven operation of the belts 59.

The self-adjusting carrier frame 55ª, is guided in its upward movement directly over the frame 1 by the opposite side guide arms 62, secured to the opposite frame sides 2, and extending there-above, and spacing blocks 63, secured on top of the frame sides 2, hold the belts 59, at a proper distance above the main apron 24. The belt roller 57 at the upper end of the frame 55 has mounted on one shaft extremity thereof the upper gear pinion 64, that meshes with an intermediate adjustable pinion or cog wheel 65, that is journaled on the journal pin 66, connecting the meeting ends of separate pairs of gear links 67, the upper pair of links being pivotally connected at one end to the shaft extremity of the roller 57 and the lower pair of links being pivotally mounted on the journal pin 68, supported at the upper end of one of the frame sides 2, and carrying thereon the lower gear pinion 69, that meshes with the operating pinion 70, mounted on one end of the shaft of the upper apron roller 22, in order to communicate motion to the several pinions to operate the belt 59, irrespective of the adjustment of the frame 55. As the frame 55 adjusts itself up and down it will be noted that the intermediate adjustable pinion 65, is always held in mesh with the pinions 64 and 69.

At the upper end of the inclined carrier frame 1, are located the supporting hooks 71, that are adapted to be detachably engaged by the upper edge of the guard apron plate 72, provided with the convergent side flanges 73, that provide means for directing the hay onto the wagon and preventing it from blowing back under the upper end of the carrier.

Changes in the form, proportion and the minor details of construction may be resorted to without departing from the principle or sacrificing any of the advantages of this invention.

Having thus described the invention, what is claimed, and desired to be secured by Letters Patent, is—

1. In a hay rake and loader, the combination with the wheeled inclined carrier frame and the carrier apron therein; of an adjustable rake having an oscillating rake bar supported over the lower end of said carrier frame, a rock arm attached to said rake bar, a weight arm pivotally connected at one end to the upper extremity of said rock arm, a weight block adjustably mounted on said weight arm, a swinging adjusting arm pivoted at one end to one side of the carrier frame and adjustably at its other end to said weight arm, the adjustment of said adjusting arm being compensated for by a corresponding adjustment of said weight block and an adjusting cord or wire connected with the connection between the adjusting arm and the weight arm, substantially as set forth.

2. In a hay rake and loader, the combination with the carrier frame and the upper and lower apron rollers; of the chain wheels loosely mounted on the shaft extremities of the upper apron roller and provided at one side with clutch faces, the drive chains arranged to pass over said chain wheels, clutch collars feathered on the shaft extremities at one side of the chain wheels and provided with spring sockets, catch pins fitted in the shaft extremities, springs arranged in the sockets of said collars and bearing at one end against said catch pins, and a suitable catch or lock attached directly to said collars and adapted to engage with said catch pins to hold the collars out of engagement with the clutch faces of the chain wheels, substantially as set forth.

3. In a hay rake and loader, the combination with the carrier frame and the upper and lower apron rollers; of the chain wheels loosely mounted on the shaft extremities of the upper apron rollers and provided at one side with clutch faces, the drive chains arranged to pass over said chain wheels, spring actuated clutch collars feathered on the shaft extremities at one side of said chain wheels, catch pins fitted in the shaft extremities, and U-shaped lock bails pivotally connected with said clutch collars and adapted to be temporarily engaged with said catch pins, substantially as set forth.

4. In a hay rake and loader, the combination with the main carrier frame and the endless carrier apron traveling therein, of opposite guide arms secured at opposite sides of the main carrier frame, a self-adjusting supplemental carrier frame pivoted at one end over the lower end of the main carrier frame, a belt roller journaled at the upper end of the self-adjusting frame and carrying a series of spaced flanged belt pulleys, a series of spring-wire supporting arms attached to the lower pivoted end of the self-adjusting frame and extending beyond such end, belt pulleys journaled at the outer unattached extremities of said supporting arms, a longitudinal series of separate and independent auxiliary carrier belts arranged on the belt pulleys of said belt roller and on said wire arms, and adjustable gearing between said upper belt roller and the upper apron roller of said carrier apron, substantially as set forth.

5. In a hay rake and loader, the combination with the inclined main carrier frame and the apron traveling therein; of the self-adjusting supplemental carrier frame pivotally supported at one end over the main carrier frame, a longitudinal series of auxiliary carrier belts arranged to travel on the shelf adjusting frame, spring supports for the lower portions of each separate carrier belt, an operating pinion mounted on one shaft extremity of the upper apron roller of said carrier apron, a fixed lower gear pinion meshing with said operating pinion, an upper gear pinion mounted on one shaft extremity of the upper belt roller of said self adjusting frame, separate pairs of gear links respectively connected pivotally at one end at both sides of said upper and lower gear pinions, and an intermediate adjustable pinion meshing with both the upper and lower gear pinions and journaled on the connection between the separate pairs of gear links, substantially as set forth.

In testimony that I claim the foregoing as my own I have hereto affixed my signature in the presence of two witnesses.

JOHN MARTIN.

Witnesses:
   J. M. THOMPSON.
   I. HOLVICK.